(12) United States Patent
Paradise

(10) Patent No.: US 8,950,170 B2
(45) Date of Patent: Feb. 10, 2015

(54) AIRCRAFT FUEL SYSTEM COOLING FLOW DEVICE

(75) Inventor: Bruce Paradise, Avon, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1186 days.

(21) Appl. No.: 13/042,538

(22) Filed: Mar. 8, 2011

(65) Prior Publication Data

US 2012/0227409 A1 Sep. 13, 2012

(51) Int. Cl.
| | | |
|---|---|---|
| *F02C 7/12* | (2006.01) | |
| *F01D 25/08* | (2006.01) | |
| *F16K 17/38* | (2006.01) | |
| *F16K 99/00* | (2006.01) | |
| *F02C 7/22* | (2006.01) | |
| *F16K 31/00* | (2006.01) | |
| *F02C 7/232* | (2006.01) | |

(52) U.S. Cl.
CPC . *F01D 25/08* (2013.01); *F02C 7/12* (2013.01); *F16K 99/0038* (2013.01); *F02C 7/22* (2013.01); *Y02T 50/675* (2013.01); *F16K 17/38* (2013.01); *F16K 31/002* (2013.01); *F02C 7/232* (2013.01)
USPC .......................................... 60/39.83; 60/734

(58) Field of Classification Search
CPC .............. F01D 25/08; F02C 7/12; F02C 7/22; F02C 7/232; F02C 9/263; F16K 17/38; F16K 31/002; F16K 99/0038
USPC ............ 60/39.83, 734, 736; 236/93 R, 95, 96
See application file for complete search history.

(56) References Cited

U.S. PATENT DOCUMENTS

| | | | | |
|---|---|---|---|---|
| 3,060,362 A | * | 10/1962 | Redmond et al. ............. | 318/591 |
| 3,782,681 A | * | 1/1974 | Blackstein ...................... | 251/11 |
| 3,878,316 A | * | 4/1975 | Groff ............................. | 174/258 |
| 3,908,933 A | * | 9/1975 | Goss et al. .................... | 244/3.21 |
| 4,283,006 A | * | 8/1981 | Fedewitz ....................... | 236/1 G |
| 4,631,928 A | * | 12/1986 | Walker .......................... | 62/51.2 |
| 4,637,420 A | | 1/1987 | Dyer | |
| 4,715,395 A | | 12/1987 | Mainelli et al. | |
| 4,716,763 A | | 1/1988 | Moffatt et al. | |
| 4,726,227 A | | 2/1988 | Moffatt et al. | |
| 4,825,642 A | | 5/1989 | Radtke | |

(Continued)

FOREIGN PATENT DOCUMENTS

GB 1 365 827 9/1974

OTHER PUBLICATIONS

Coefficients of Thermal Expansion of various materials—http://www.engineeringtoolbox.com/linear-expansion-coefficients-d_95.html—accessed on Apr. 2, 2014.*

(Continued)

*Primary Examiner* — William H Rodriguez
*Assistant Examiner* — Lorne Meade
(74) *Attorney, Agent, or Firm* — Carlson, Gaskey & Olds, P.C.

(57) ABSTRACT

A cooling system includes a housing having an aperture intersecting a passage that includes first and second passage portions. A plug is arranged in the aperture in an interference fit in a first position at a first temperature condition to block the passage and fluidly separate the first and second passage portions. A biasing element is arranged in the housing and is configured to move the plug from the first position to a second position at a second temperature condition to fluidly connect the first and second passage portions.

18 Claims, 1 Drawing Sheet

(56) References Cited

U.S. PATENT DOCUMENTS

| | | | |
|---|---|---|---|
| 5,261,597 A * | 11/1993 | Perlman et al. | 236/93 R |
| 5,448,890 A | 9/1995 | Coughlan, III et al. | |
| 5,754,090 A | 5/1998 | Arensmeier | |
| 6,783,108 B2 | 8/2004 | Jansen | |
| 7,299,994 B2 * | 11/2007 | Brown et al. | 236/34.5 |
| 7,384,248 B2 * | 6/2008 | Jansen | 417/413.1 |
| 7,450,053 B2 * | 11/2008 | Funk et al. | 342/22 |
| 2008/0149070 A1 | 6/2008 | Bohlmann et al. | |
| 2009/0320480 A1 | 12/2009 | Scully | |
| 2009/0320481 A1 | 12/2009 | Scully | |
| 2009/0320482 A1 | 12/2009 | Scully | |

OTHER PUBLICATIONS

The aircraft Gas Turbine Engine and its operation, United Technologies Corporation, Part No. P&W 182408, Aug. 1988.*

United Kingdom Search Report for United Kingdom Application No. GB1203741.2, Jun. 18, 2012.

The Designer's Guide to Tungsten Carbide, General Carbide, Jul. 2008.

* cited by examiner

AIRCRAFT FUEL SYSTEM COOLING FLOW DEVICE

BACKGROUND

This disclosure relates to an aircraft fuel system for a gas turbine engine. More particularly, the disclosure relates to a cooling device for a fuel system component.

Aircraft engine fuel components are required to be fire resistant and are subjected to fire tests. One typical fire test exposes the component under test to a 2,000° F. flame within six inches for five minutes. To pass the test, the component is not permitted to contribute to the fire. Fueldraulic actuators often use a cooling flow orifice to maintain a constant fuel flow through the device so that the actuator can survive an engine fire without failing and causing external leakage that would then contribute to the fire.

Typically, fuel from a fuel tank is pumped to a fuel component, such as a fueldraulic actuator or a fuel metering unit. Example fueldraulic devices include stator vane actuators, air bleed valves and turbine clearance control valves. The fuel may be used at the device and then provided to the combustor after picking up heat from the fuel component.

SUMMARY

A cooling system includes a housing having an aperture intersecting a passage that includes first and second passage portions. A plug is arranged in the aperture in an interference fit in a first position at a first temperature condition to block the passage and fluidly separate the first and second passage portions. A biasing element is arranged in the housing and is configured to move the plug from the first position to a second position at a second temperature condition to fluidly connect the first and second passage portions.

A method of cooling a gas turbine engine component includes providing a plug arranged in an aperture of a housing in an interference fit in a first position at a first temperature to block a passage in the housing and fluidly separate the first and second passage portions of the passage. A second temperature is applied to the housing greater than the first temperature. The plug is moved in response to a temperature differential from the first position to a second position that fluidly connects the first and second passage portions. Fuel flows from the first passage portion to the second passage portion to cool the housing.

BRIEF DESCRIPTION OF THE DRAWINGS

The disclosure can be further understood by reference to the following detailed description when considered in connection with the accompanying drawings wherein.

DETAILED DESCRIPTION

Figure 1:
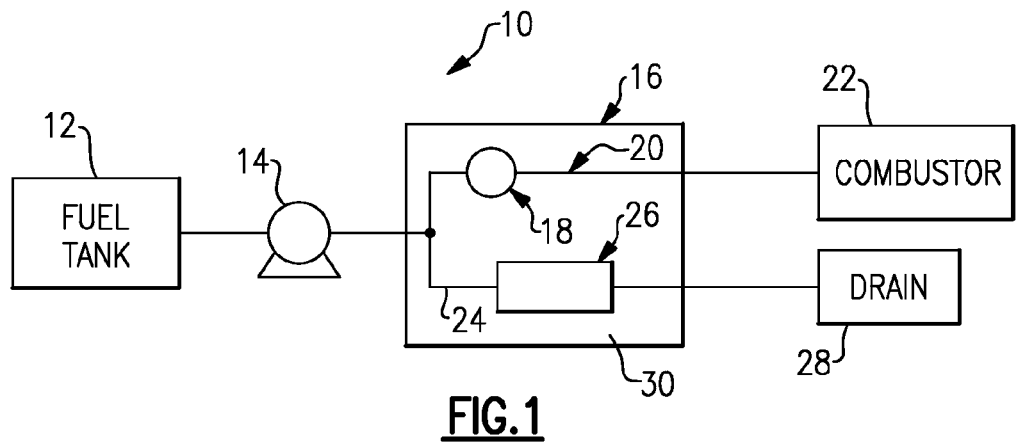
FIG. 1 is a schematic view of an aircraft fuel system including a cooling flow device.

An aircraft fuel system 10 is schematically depicted in FIG. 1. The system 10 includes a fuel source 12, such as a fuel tank. Fuel from the fuel tank 12 is supplied to a fuel system component 16 by a pump 14. The fuel system component 16 may be a fuel metering unit or, in the example illustrated, a fueldraulic actuator including a valve 18. The valve 18 is arranged in a first passage 20 and is operable to actuate a device, such as variable stator vanes, air bleed valve, or turbine clearance control device. Fuel operating the valve 18 typically picks up heat from the fuel system component 16 such that the heated fuel can be used to improve the efficiency of the combustor 22.

In the example, the fuel system component 16 also includes a second passage 24 that is in fluid communication with the first passage 20. A cooling flow device 26 is arranged in the second passage 24 to selectively create a fuel flow within the housing 30 when exposed to a high temperature fire to increase the fire resistance of the fuel system component 16. The cooling flow device 26 normally blocks the second passage 24 during normal operating temperatures. At a predetermined temperature differential between the housing 30 and the cooling flow device 26, flow is permitted through the second passage 24 and expelled through a body drain 28 to remove the heat from the fuel system component 16.

Figure 2:
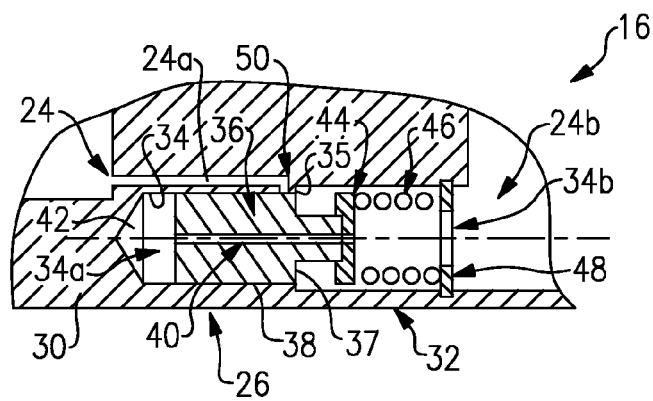
FIG. 2 is an example cooling flow device having a plug arranged in an aperture of a housing in an interference fit in a first position at a first temperature condition.

Referring to FIG. 2, an example cooling flow device 26 is illustrated. The housing 30 includes an exterior surface 32 that is exposed to environmental temperatures. The housing 30 includes an aperture 34, which is a cylindrical hole in one example having an inner diameter. The housing 30 is constructed from an aluminum alloy, for example. One example aluminum alloy has a coefficient of linear expansion of $12.3 \times 10^{-6}$ inch/inch ° F. ($22.14 \times 10^{-6}$ mm/mm ° C.).

A plug 36 having an outer surface 38 is received in the aperture 34 in an interference fit in a first position (FIG. 2) at a first temperature condition corresponding to a range of normal operating temperatures, such as 70° F. (21° C.) room temperature. The plug 36 includes a surface 37 that is coplanar or flush with a ledge 35 in the aperture 34 when the plug 36 is pressed into the aperture 34 during installation. In one example, a spring bore has a larger diameter than the plug bore to provide the ledge 35, as shown in FIG. 2. In one example, the plug 36 is constructed from a thermally stable iron-nickel alloy, such as FeNi36±6%. In another example, the iron-nickel alloy is provided by a material available under the trade name INVAR. An example iron-nickel alloy material has a coefficient of linear expansion of $0.8 \times 10^{-6}$ inch/inch ° F. ($1.44 \times 10^{-6}$ mm/mm ° C.). Thus, the aluminum will expand over 15 times more than the plug for a given increase in temperature.

The aperture 34 intersects the second passage 24 separating the second passage 24 into first and second passage portions 24A, 24B. The plug 36 separates the aperture 34 into first and second sides 34A, 34B. A cavity 42 is provided on the first side 34A. A vent hole 40 is provided in the plug 36 and extends between and fluidly connects the first and second sides 34A, 34B. The plug 36 provides a seat 44. A biasing element 46 is provided at the second side 34B and is captured within the aperture 34 between a retainer 48 and the seat 44.

In one example, the biasing element 46 is a steel coil spring that exerts a load on the plug 36 at the first temperature condition. In another example, the spring 46 is constructed from a shaped memory alloy that is provided in a collapsed state at the first temperature condition to exert no or virtually no load on the plug 36.

Figure 3:
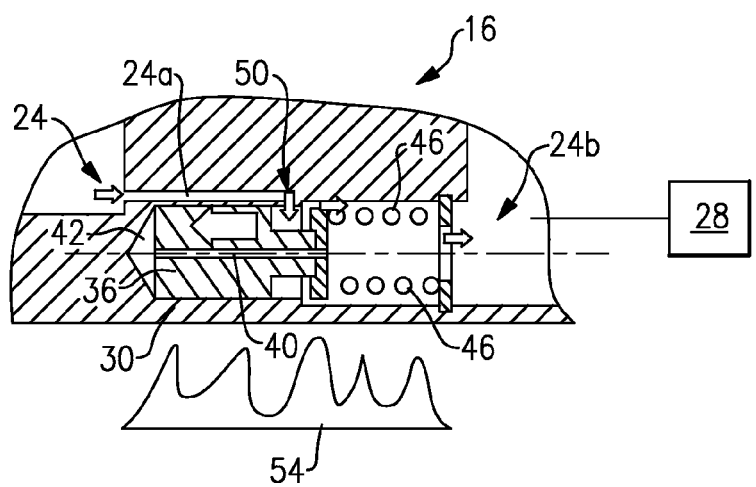
FIG. 3 is a cross-sectional view of the plug in a second position at a second temperature condition.

Referring to FIG. 3, a heat source 54 exterior to the housing 30 in the example, creates a temperature differential between the housing 30 and the plug 36 sufficient to diminish the interference fit enabling the plug 36 to move from the first position (FIG. 2) to a second position (FIG. 3). In one example, the second temperature, for example 300° F. (148.9° C.), reduces the clearance between the plug 36 and the housing 30 to a slip fit. The biasing element 46 urges the plug 36 to move from the first position to the second position. If a shaped memory alloy material is used for the biasing element 46, the predetermined temperature differential returns the shape memory alloy material to an expanded state that applies a load to the plug 36. Fluid from the cavity 42 is vented through the vent hole 40.

In the second position, the plug 36 permits a fluid connection between the first and second passages 24A, 24B permitting fuel to flow through the second passage 24 to the body drain 28 enabling heat to be removed from the fuel system component 16. The first passage portion 24A includes a window or orifice 50 that regulates the fuel flow through the second passage 24B.

Although an example embodiment has been disclosed, a worker of ordinary skill in this art would recognize that certain modifications would come within the scope of the claims. For that reason, the following claims should be studied to determine their true scope and content.

What is claimed is:

1. A cooling system comprising:
   a housing including an aperture intersecting a passage having first and second passage portions;
   a plug arranged in the aperture in an interference fit in a first position at a first temperature condition to block the passage and fluidly separate the first and second passage portions;
   a biasing element arranged in the housing and configured to move the plug from the first position to a second position at a second temperature condition and fluidly connect the first and second passage portions; and
   a first fuel system component providing the passage, and a second fuel system component in fluid communication with the first fuel system component, wherein the first fuel system component is a fueldraulic actuator.

2. The cooling system according to claim 1, comprising a body drain, wherein the second passage portion is in fluid communication with the body drain.

3. The cooling system according to claim 1, wherein the aperture provides a cavity between the plug and the housing in the first position, the plug includes a first side facing the cavity and extending to a second side opposite the first side, the biasing element arranged on the second side, and a vent extending and interconnecting to the first and second sides.

4. The cooling system according to claim 1, wherein the plug provides a seat, and the biasing element includes a spring extending from the seat to a retainer secured to the housing.

5. The cooling system according to claim 4, wherein the spring is a coil spring.

6. The cooling system according to claim 4, wherein the spring is provided by a shaped memory alloy having collapsed and extended positions respectively at the first and second temperatures, the spring exerting virtually no load on the plug in the collapsed position.

7. The cooling system according to claim 1, wherein the first and second temperatures corresponding to a differential pressure that diminishes the interference fit to a slip fit, and the plug includes a surface flush with a ledge of the aperture in the first position.

8. The cooling system according to claim 7, wherein the second temperature is 300° F.

9. The cooling system according to claim 1, wherein the housing is an aluminum alloy, and the plug is a thermally stable iron-nickel alloy.

10. The cooling system according to claim 9, wherein the plug is FeNi36±6% nickel.

11. A cooling system comprising:
    a housing including an aperture intersecting a passage having first and second passage portions;
    a plug arranged in the aperture in an interference fit in a first position at a first temperature condition to block the passage and fluidly separate the first and second passage portions;
    a biasing element arranged in the housing and configured to move the plug from the first position to a second position at a second temperature condition and fluidly connect the first and second passage portions; and
    a first fuel system component providing the passage, and a second fuel system component in fluid communication with the first fuel system component, wherein the first fuel system component is a fuel metering unit.

12. The cooling system according to claim 11, comprising a body drain, wherein the second passage portion is in fluid communication with the body drain.

13. The cooling system according to claim 11, wherein the second temperature is 300° F.

14. The cooling system according to claim 11, wherein the housing is an aluminum alloy, and the plug is a thermally stable iron-nickel alloy.

15. A cooling system comprising:
    a housing including an aperture intersecting a passage having first and second passage portions;
    a plug arranged in the aperture in an interference fit in a first position at a first temperature condition to block the passage and fluidly separate the first and second passage portions;
    a biasing element arranged in the housing and configured to move the plug from the first position to a second position at a second temperature condition and fluidly connect the first and second passage portions;
    a first fuel system component providing the passage, and a second fuel system component in fluid communication with the first fuel system component; and
    a fuel source in fluid communication with the passage, and wherein a valve is arranged in the passage and configured to regulate fuel from the fuel source, and a second passage downstream from the valve and configured to provide fuel to the second fuel system component, wherein the second fuel system component is a combustor.

16. The cooling system according to claim 15, comprising a body drain, wherein the second passage portion is in fluid communication with the body drain.

17. The cooling system according to claim 15, wherein the second temperature is 300° F.

18. The cooling system according to claim 15, wherein the housing is an aluminum alloy, and the plug is a thermally stable iron-nickel alloy.

* * * * *